April 15, 1952 E. SALIN 2,592,745
SQUARING CARPENTER'S SAW
Filed Aug. 16, 1948
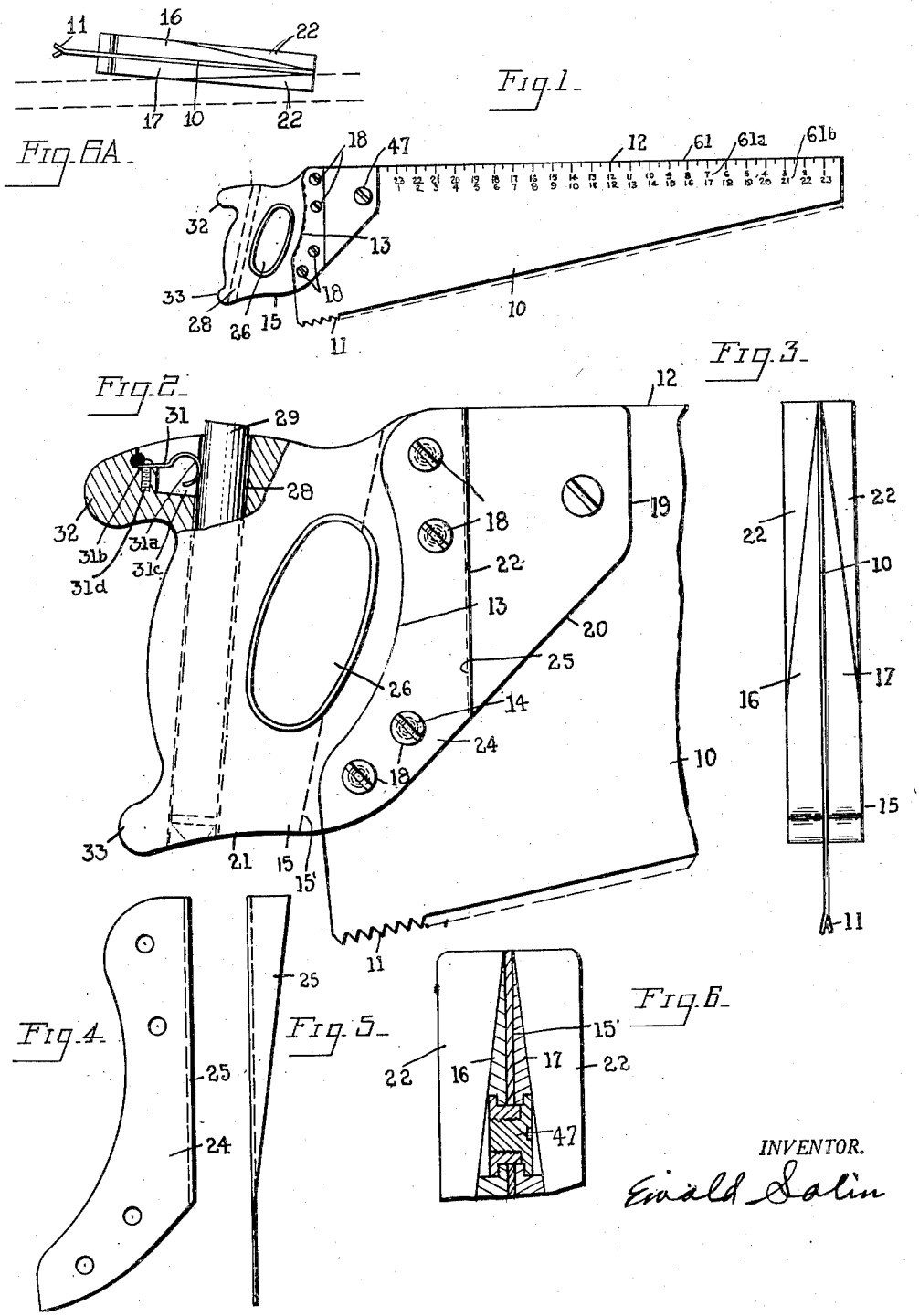
INVENTOR.
Ewald Salin Patented Apr. 15, 1952

2,592,745

UNITED STATES PATENT OFFICE 2,592,745

SQUARING CARPENTER'S SAW

Ewald Salin, New York, N. Y.

Application August 16, 1948, Serial No. 44,548

1 Claim. (Cl. 7—13)

This invention relates to an improved hand saw construction, and particularly to the provision for means for utilizing a straight edge on the saw blade and the handle to square work to be cut, and one of the objects of the invention is to provide a hand saw with a handle having a shoulder disposed at right angles to the straight edge of the saw blade, which tapers from the straight edge, so as to reduce the area of contact with a board being cut, and thus prevent injury to the board.

A further object of the invention is the provision of a hand saw with a handle having a metal wear plate mounted thereon and providing the tapered right angular shoulder.

With the above and other objects in view the invention comprises certain new and useful constructions, combinations and arrangements of parts, clearly described in the following specification, and fully illustrated in the accompanying drawings, in which:

Fig. 1 is a side elevation of the improved hand saw.

Fig. 2 is an enlarged side elevation of the handle, the blade being shown broken away.

Fig. 3 is a front end view of the saw.

Fig. 4 is a detail side elevation of one of the wear plates.

Fig. 5 is a detail edge view thereof.

Fig. 6 is a fragmentary sectional view through one of the clamping screws, enlarged, looking through the tapered shoulders.

Fig. 6A is a detail end view, on a reduced scale, showing the use of the tapered squaring shoulder of the handle, to lift the cutting edge of the saw above the plane of the board to be marked, by the use of a pencil against the upper straight edge of the saw blade, the board being indicated in dotted lines.

Referring to the accompanying drawings, which illustrate the practical embodiment of my invention, 10 designates a metal saw blade having a toothed cutting edge 11, and a straight ruling edge 12 on the opposite side thereof. The rear end of the saw blade is formed with a concave curved holding edge 13, and provided with a plurality of screw receiving holes 14.

The rear end of the saw blade 10 is secured in the handle 15, which may be wood, plastic, aluminum, magnesium, or other suitable material, and which is formed with a blade receiving cut or slot 15'.

The handle thus provides two similar holding jaws 16 and 17, between which the rear end of the saw blade is gripped, by the male and female screws 18, which are extended through holes formed in these jaws which align with the holes 14 of the saw blade.

Each jaw is formed with a forward end face or shoulder 19, which is designed to be disposed at right angles to the straight edge 12 of the saw blade 10, and with another forward edge 20, which is disposed at an angle of forty-five degrees to the forward end edge or shoulder 19, and which extends downwardly and rearwardly from the shoulder 19, to the rearwardly curved bottom edge 21 of the saw handle.

Rearwardly of the forward shoulder 19 a squaring shoulder 22 is formed on each side of the saw handle, which is disposed at right angles to the straight edge of the saw blade. The shoulder 22 decreases in depth from the ruling straight edge 12 of the saw blade to the shoulder 20, due to the fact that the shoulder is tapered from its upper end to its lower end, where the taper becomes zero.

In order to protect the material of which the handle is constructed, from excessive wear, a wear plate 24 is attached to the outer face of each blade holding jaw of the handle by means of the holding screws 18. This wear plate is formed with a lateral flange 25, which is disposed against the right angular squaring shoulder 22, and thus provides a wear element therefor.

The handle is formed with a hand hole 26, and rearwardly of this hand hole a diagonal pocket 28 is formed in the stock of the handle, and this pocket is sized to receive a short lumber or carpenter's pencil 29, and the lower end of this pocket is open. To retain the pencil in the pocket I provide a spring retainer 31, which has a terminal loop 31a on its outer end, while its inner flat end is secured to a shoulder or seat 31b formed in the stock of the handle. The terminal loop 31a normally projects into the pocket 28 so as to exert lateral spring pressure on a pencil forced into this pocket. When this is done the terminal loop 31a will be slightly depressed and the handle stock is provided with a recess 31c to receive the terminal loop as it is forced down. A screw or pin 31d holds the flat end of the spring retainer on the seat 31b.

The handle is also provided with the usual hand stop lug 32 on the upper rear end thereof, and the bottom hand stop lug 33.

The wedge shaped side jaws 16 and 17 are clamped against the blade by means of an interfitting male and female screw set 47, shown in Fig. 6.

It is understood that various changes in the details of construction, their combination and arrangement, may be made in adapting the improved saw handle and blade for commercial production, all within the scope of the claim appended hereto, which defines the invention.

I claim as new and patentable:

In a hand saw of the type having a saw blade and a handle clamped thereto, the blade having a longitudinal straight ruling edge and a conventional toothed cutting edge, the improvement comprising an extension of the handle, said extension increasing in thickness from the ruling edge of the blade toward the toothed cutting edge thereof, thereby forming a tapered shoulder where the extension joins the handle, said shoulder extending at right angles to the ruling edge of the blade, whereby with the shoulder placed against the edge of the work and the extension lying flat on the surface of the work, the ruling edge of the blade will lie on the surface and the toothed edge will be spaced from the surface of the work so as to avoid marring thereof.

EWALD SALIN.

REFERENCES CITED

The following references are of record in the file of this patent:

UNITED STATES PATENTS

| Number | Name | Date |
|---|---|---|
| 1,151,078 | Young | Aug. 24, 1915 |
| 1,306,165 | Benson | June 10, 1919 |
| 1,395,957 | Griffin | Nov. 1, 1921 |
| 1,425,536 | Neron | Aug. 15, 1922 |
| 1,517,986 | Hayward | Dec. 2, 1924 |
| 1,613,432 | Barr | Jan. 4, 1927 |
| 1,641,831 | Shearer | Sept. 6, 1927 |
| 1,665,504 | Midgley | Apr. 10, 1928 |
| 1,803,463 | Danielson | May 5, 1931 |